April 16, 1940.  M. A. DIBBLE ET AL  2,196,983

MIXING APPARATUS

Filed Jan. 3, 1939

Inventors
Marion A. Dibble
Gordon R. McCormick
Rollo G. Russel

By R. F. Miller
Attorney

Patented Apr. 16, 1940

2,196,983

UNITED STATES PATENT OFFICE 2,196,983

MIXING APPARATUS

Marion A. Dibble, Toledo, Ohio, and Gordon R. McCormick and Rollo G. Russell, Flint, Mich., assignors to E. I. du Pont de Nemours & Company, Wilmington, Del., a corporation of Delaware Application January 3, 1939, Serial No. 249,116

2 Claims. (Cl. 259—104)

This invention relates to mixing machines and more particularly to apparatus for handling heavy and viscous mixtures.

In the mixing of materials in a highly viscous state, and particularly in pigment dispersion where high cohesive force is desired to bring about the desired shearing action on the pigment particles, various types of mixing machines have been proposed to develop the large forces required. The mixing means suggested has included the extrusion of the plastic material under high compression through a perforated plate, the use of mixers provided with a single worm, and two blade dispersion mixers. The apparatus available, however, has been unsatisfactory from one or more of the standpoints of convenience of operation, amount of material handled in a given time, and development of the high extrusive forces necessary for efficient dispersing or mixing.

This invention has as an object new and improved mixing apparatus. A further object is an apparatus of this kind adapted to the treatment of heavy and viscous masses, such as plastics or pastes, with rapid and complete mixing or dispersion of the ingredients of the mass. Other objects will appear hereinafter.

The preferred embodiment of our invention is illustrated by the accompanying drawing in which Fig. 1 is an isometric view with parts broken away showing the dispersion or mixing apparatus with its arrangement of double worms used in the practice of this invention;

Figure 1:
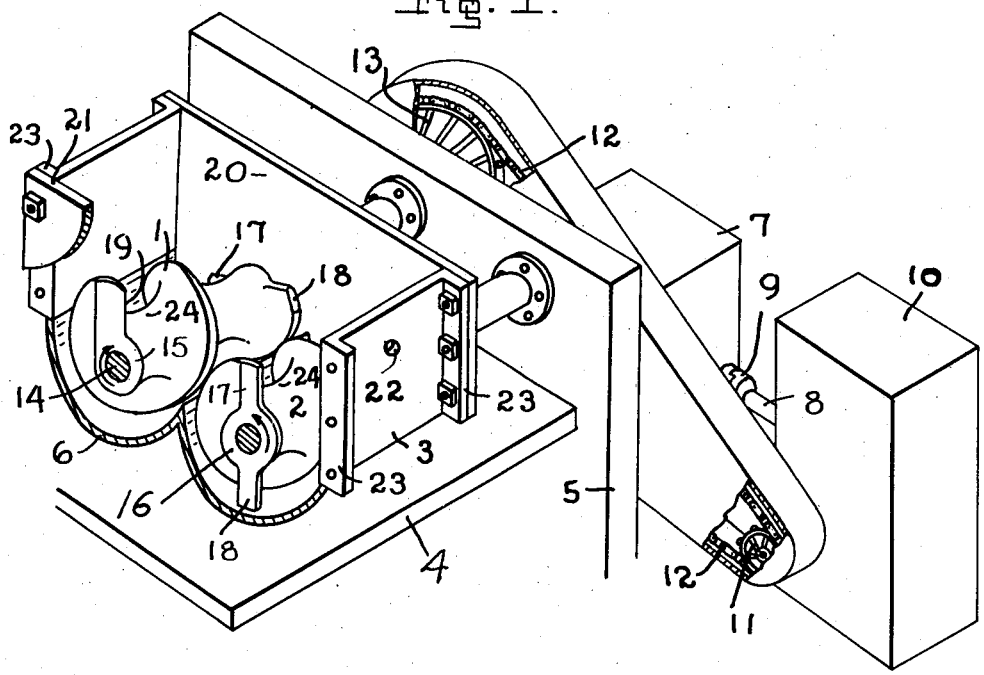
Figure 2:
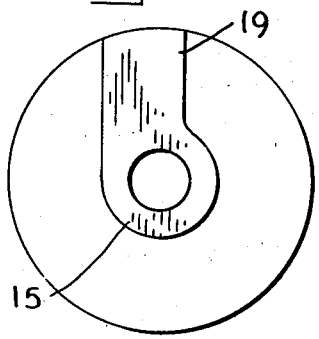
Fig. 2 is a view of the scraper end of the worms.
Figures 3, 4:
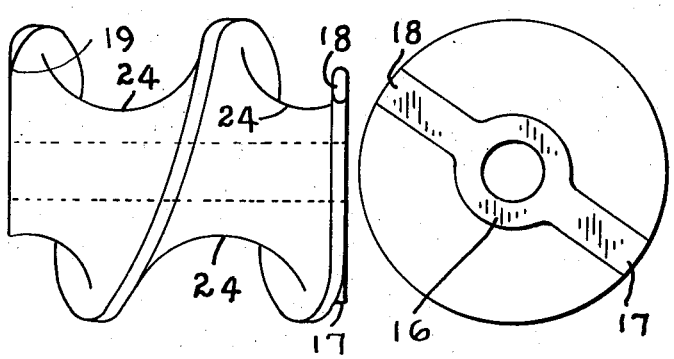
Fig. 3 is a side view of one of the duplicate worms.
Fig. 4 is a view of the extrusion end of the worms.

The closely adjacent pairs of worms 1 and 2 of the same pitch and with the thread running in the same direction are rotatably mounted with their axis parallel in the vessel or tank 3 mounted on a suitable support or frame structure which includes the horizontal member 4 and a vertical member 5. The bottom of the vessel is formed into two troughs extending under and along the worms as shown.

The worms are rotated in opposite directions by a motor 7 which by means of shaft 8 and clutch 9 drives suitable reduction gearing in the housing 10 from which the sprocket 11 is driven. The chain 12 connects the sprocket 11 with the larger sprocket 13 rigid with one of the worm shafts 14 which are in turn rigid with the worms. The other worm is driven at the same speed in the opposite direction by means of spur gears not shown which connect the two shafts. The worm shafts are rotatably mounted in conventional manner in the end plates 20 and 21, which together with the side frames carry the total power load.

The ends of each worm are somewhat differently formed, the end indicated by the numeral 15 being the scraper end and the end indicated by the numeral 16 being the extrusion end. The pitch of each worm becomes zero at the extrusion end only on which is formed the extrusion or dispersion blades 17 and 18, the planes of which are at right angles to the worm axis. The outer end of one blade, 17, is the termination of the worm spiral which recedes back of the plane of the blades so that the outer end of the opposite blade 18 is spaced one-half the pitch of the worm from the adjacent spiral. This last mentioned blade although desirable is not essential. The scraper end 15, however, has a relatively sharp edge 19 as would be formed by cutting through the worm at right angles to the axis.

In the construction shown in the drawing the portion of the spiral where the pitch is zero, a width of one to a few inches from the edge of the spiral perpendicular to the worm axis, is machined to a flat face to form the dispersion blade 17. The supplemental blade 18, cast integral with the hub of the worm, is of zero pitch for at least a portion of its width, this portion being formed with a face similar to that on blade 17. These faces are in the same plane and are parallel but may be offset in the sense that the plane of one blade is not necessarily an extension of the other through the hub. The blade 18 may be wider than the dispersion face formed therein and extend beyond it in the direction of rotation and this additional width formed into a portion which follows the pitch of the worm.

The worms are constructed to avoid the considerable difficulty in cleaning them that would otherwise be experienced through the provision of self-cleaning fillets in the form of the built-up concave portions 24 extending between the worm blades or spirals.

During the mixing, vehicle may be added when required through a conduit passing through the orifice 22, and suitable means not shown may be provided for emptying the composition from the tank after mixing.

The size of the mixer, the length of the worms and pitch may vary somewhat depending upon the amount and character of the material being treated. For a thirty gallon mixer the diameter and length of the worms is preferably about 15 inches, the pitch 9 inches, revolutions per minute 63, and the width of the dimension of the tank at right angles to the worm axis about 30 inches. These figures may of course vary somewhat, as for instance the worm length may be thirty inches, the pitch from 6 to 12 inches, and the revolutions per minute from 25 to 90.

In operation, a portion of the mass conveyed by the worm 2 to the extrusion end 16 is squeezed with a wiping action under great force against the end plates 21 or other abutment member spaced slightly, usually about 1/16 inch, from the end of the worm. This clearance distance may be varied by spacer strips inserted between the flanges 23 and the end plates, or by means of thrust bearings in which the worm shafts are adjustable endwise. The material between the end plate 21 and the worm 2 is wiped or extruded under extremely high pressure through the narrow space separating the end of the worm and end plate toward the worm 1 and is taken up at the scraper end of that worm which conveys the mass to the opposite or extrusion end of worm 1 where a portion of the mass is again squeezed against the end plate and transferred to the scraper end of worm 2. This circuit of action, in which portions of the mass are continuously squeezed under great force and incorporated into the body of the material being treated, is thus continuously repeated.

Although the present invention as previously indicated is particularly useful for pigment dispersion, it is applicable to any type of mixing requiring handling of very heavy and viscous pastes where extrusion is an essential or desirable part of the mixing operation. The mechanism described herein may for instance be used as a putty chaser, a soap crutcher, dough mixer, and for mixing plastic and abrasive compounds.

The mechanism described herein presents several important advantages over the types of mixers heretofore used for similar purposes. The present invention is characterized by extrusion under great pressure, a type of action not involved in the two-blade dispersion mixers which depend on a shearing or pulling apart action. In comparison with single worm mixers it will be observed that the extrusion action at one end of the present mechanism and a cleaning or scraping action at the opposite end are features which cannot be present in single worm mixers because of the fundamental difference in design. In the operation of a single worm mixer the material drops back into the worm feed from the end plate. In our new mixer, on the other hand, the adjacent parallel worm by its scraping action performs the function of starting the material on its cycle of rotation. Furthermore, in a single worm mixer this cycle is in a vertical plane, whereas in our mixer this cycle of rotation is in a horizontal plane which results in much faster arrival at homogeneity. The material in the present mixer constantly being subjected to an extrusion force by one worm or is being returned to the opposite end of the parallel worm for similar extrusion. The arrangement of the worms in the mixer leaves, to all practical purposes, no dead spot or no spot where the material does not move in any direction but lies somewhat dormant. A further advantage resides in the mixing or dispersing in the center of the mixer due to the opposite relative rotation of the worms and in the fact that the direction of rotation is towards the adjacent worm and this keeps the sides of the mixer free from a pile-up of material on the sides. It is for this reason that the worms are preferably of similar threads and rotated in the same direction. The threads, however, may be opposite and rotation of the worms in the same direction since many of the other advantages are retained. The large self-cleaning fillets in the worms results in more readily obtaining the desired state of homogeneity. The present mixer may be emptied readily through valve openings at the end of the mixer and does not need to be raised, as in the dumping method applied to known existing equipment, as for instance a Werner Pfleiderer mixer. The present construction readily allows for adjustable end clearance of the worms from the end plates which makes possible a variable degree of dispersion. The supplementary extrusion blade adds further to the advantage of our new apparatus since the extra blade contributes to more efficient dispersion due to the increased extruding area.

As many apparently widely different embodiments of this invention may be made without departing from the spirit and scope thereof, it is to be understood that we do not limit ourselves to the specific embodiments thereof except as defined in the appended claims.

We claim:

1. In a mixing apparatus substantially parallel adjacent companion worms, means for rotating said worms, the direction of rotation and thread of said worms being such as to convey the material being mixed toward opposite ends of the worms, one end of each worm terminating in a portion of zero pitch on which portion an extrusion face is formed, the pitch of the worm continuing through to a scraper end at the opposite end of the worm, said worms being positioned with the extrusion face of one worm adjacent to the scraper end of the companion worm, and an abutment plate spaced a short distance from the ends of the worms against which the material being mixed is extruded and wiped by said extrusion face to said scraper end.

2. The mixing apparatus set forth in claim 1 in which the worms are of the same thread and rotatable in opposite directions.

MARION A. DIBBLE.
GORDON R. McCORMICK.
ROLLO G. RUSSELL.